(12) United States Patent
Nachamiev et al.

(10) Patent No.: US 7,392,405 B2
(45) Date of Patent: *Jun. 24, 2008

(54) DIGITALLY CONTROLLED POWER SUPPLY

(75) Inventors: Artur Nachamiev, Carmiel (IL); Oleg Boyarko, Carmiel (IL)

(73) Assignee: Ohm Power Solutions, Ltd., Carmiel, IL (US)

( * ) Notice: Subject to any disclaimer, the term of this patent is extended or adjusted under 35 U.S.C. 154(b) by 423 days.

This patent is subject to a terminal disclaimer.

(21) Appl. No.: 10/758,876

(22) Filed: Jan. 16, 2004

(65) Prior Publication Data

US 2005/0160299 A1 Jul. 21, 2005

(51) Int. Cl.
*G05F 1/573* (2006.01)

(52) U.S. Cl. .............. 713/300; 713/310; 713/320; 713/321; 713/322; 713/323; 713/324; 713/330; 713/340; 323/266; 323/280; 323/283

(58) Field of Classification Search .............. 713/300, 713/310, 320–324, 330, 340; 323/266, 280, 323/283

See application file for complete search history.

(56) References Cited

U.S. PATENT DOCUMENTS

| | | | | |
|---|---|---|---|---|
| 5,177,372 A * | 1/1993 | Yajima et al. | .............. | 307/85 |
| 5,594,286 A * | 1/1997 | Tachikawa | .............. | 307/43 |
| 5,594,631 A * | 1/1997 | Katoozi et al. | .............. | 363/41 |
| 5,821,734 A * | 10/1998 | Faulk | .............. | 320/124 |
| 6,204,650 B1 * | 3/2001 | Shimamori | .............. | 323/283 |
| 6,473,016 B2 * | 10/2002 | Piirainen et al. | .............. | 341/139 |
| 6,614,299 B2 * | 9/2003 | Hirvilampi et al. | .............. | 330/124 R |
| 7,009,534 B2 * | 3/2006 | Nachamiev et al. | .............. | 341/110 |
| 7,047,110 B2 * | 5/2006 | Lenz et al. | .............. | 700/286 |
| 7,154,253 B1 * | 12/2006 | Gunther | .............. | 323/283 |
| 2002/0012438 A1 * | 1/2002 | Leysieffer et al. | .............. | 381/312 |
| 2004/0160216 A1 * | 8/2004 | Speranza et al. | .............. | 320/140 |

* cited by examiner

*Primary Examiner*—Abdelmoniem Elamin
(74) *Attorney, Agent, or Firm*—Angenehm Law Firm, Ltd.; N. Paul Friederichs

(57) ABSTRACT

A digitally controlled device is provided to interface between a user of adjustable power unit and an adjustable power module, where the user provides an analog user input signal for adjusting the performance of the adjustable module using a user defined standard. The digitally controlled device provides the adjustable power module an analog input signal adapted to the standard used by the module. The digital controller device for controlling adjustable power module that comprises at least one analog to digital converter for converting analog user input signal to digital input, a micro-controller adapted to receive the input digital information and operate at least one digital to analog unit in response to the digital input information and at least one digital to analog converter unit adapted to produce analog input signal for controlling adjustable module.

7 Claims, 3 Drawing Sheets

*Programming of input and output signals levels.

DIGITALLY CONTROLLED POWER SUPPLY

FIELD OF THE INVENTION

The present invention is related generally to the field of adjustable electronic power module. More particularly, the present invention is related to power supplies in which working parameters such as voltage or currents may be controlled via analog input signal.

BACKGROUND OF THE INVENTION

Electronic power supplies are commonly used. There are occasions where it is necessary to adjust some of the working parameters of the power supply such as the output voltage, the supplied current and so on. This is commonly done by applying an analog input signal to the analog input of an adjustable power supply module. For example, an adjustable power supply module capable of supplying voltage up to 100 V will produce its maximum voltage when applying 10 Volts to its analog input while application of 5 volts to the analog input will cause the power supply module to produce only 50 Volts.

Several standards are used to form the relation between the control input signals and the power supply operation, for example: the signal corresponding to the supply maximum voltage, the analog signal may be applied in the form of current instead of voltage or the analog input signal may be the application of specific resistance between input terminals of the power supply module.

In addition, some power supply modules are equipped with analog monitoring output or outputs for monitoring their operation. For example, it may be useful to monitor the current or the power drawn by the load. A monitoring analog output producing an analog output signal of a voltage proportional to the current drawn by the load, may be connected to a display unit for displaying and monitoring the supplied current.

In order to properly adjust and correctly monitor the operation of the adjustable power supply unit, it is necessary to provide it with the correct analog input signals and to be able to translate the analog monitoring output signal for meaningful interpretation of the power supply working parameters. Since several standards and proprietary translation methods are used in the industry, hardware alterations are needed to set up a power supply module for its specific use. Setting up may be done at manufacturing by soldering in components (usually resistors) of specific values, or in the field by configuring the system using switches and jumpers to select the desired value among several preinstalled components. These methods limit the flexibly of the system, are time consuming and necessitate manual handling of the system which may be hazardous when done by untrained user.

For example; Xantrex Technology manufactures the XPR series of analog-controlled power supplies for applications including burn-in, electroplating, battery charging, and steering magnets.

Analog control comes standard with the XPR Series for resistive or voltage programming of the output voltage and current limits.

Several models are available with voltage ranges of 0-3 V up to 0-30 KV and maximum current of 1 A up to 60 KA.

Standards used for analog inputs are set at the factory and selected among: Voltage input of 0-5 V or 0-10 V for full range of the supply output, Resistance input of 0-5 k or 0-10 k for full range of the supply output.

Analog monitoring signal proportional to the actual output voltage and current of the power supply is provided using one of two factory-defined standard of 0-5 V or 0-10 V for full range.

It is clear that a user analog input signal may produce undesirable output if the wrong signaling standard is used.

The Series has a straightforward front panel, featuring a seven segment LED display with several status and alarm indicators, and 10-turn knobs for voltage and current control. The front panel buttons allow users to conveniently set and view the over voltage protection set points, view the output voltage and current limits, enable output shutdown, and offer the flexibility of toggling control of the power supply between the front panel and remote analog control.

SUMMARY OF THE INVENTION

It is an object of the current invention to provide a digitally controlled device to interface between a user of adjustable power unit and an adjustable power module, where the user provide an analog user input signal for adjusting the performance of the adjustable module using a user defined standard, and the digitally controlled device provides the adjustable power module an analog input signal adopted to the standard used by the module.

Such digitally controlled device may be flexibly modified to be adapted to standards used by different users or adopted to the changing needs of a user. Unlike analog interfaces used in the art which had to be modified by hardware changes, the device of the current invention may be modified using software executed by a micro-controller.

In an exemplary embodiment of the current invention, the inventive digital controller device for controlling adjustable power module comprises at least one analog to digital converter for converting analog user input signal to digital input information and transmit said digital information to a micro-controller; a micro-controller adapted to operate at least one digital to analog unit in response to said digital input information; and at least one digital to analog converter unit adapted to produce analog input signal for controlling adjustable module.

In order to provide the user the ability to reconfigure device, said micro-controller further comprising at least one digital input for receiving at user digital commands. These commands could be provided by the user using front panel or digital communication interface with a host computer.

Often, the user wishes to monitor the performance or the status of the system. For example: the current drawn by the load, the actual voltage on adjustable power supply module, the temperature etc. The adjustable module may produce an analog monitoring signal for this purpose using signaling standard used by the module manufacturer. In order to provide the user an analog user output signal compatible with the standards used by the user, the device optionally comprises at least one analog to digital converter for receiving analog monitoring output signal from adjustable module and transmitting output digital information indicative of said analog monitoring output signal to the micro-controller. The digital information indicative of the system status may be used by the micro-processor according to its programming. As a response, the micro-controller may: change the program being executed, change the analog input signal provided to the module, send a digital message to the user, or provide the user an analog user output signal indicative of the status of the controlled power system.

In a simple example, the relation between analog input signal and analog user input signal is controlled by micro-controller to essentially follow the linear equation:

analog input signal=$A$*(analog user input signal–$B$)

Where A and B are numerical parameters of the transformation.

This transformation allows to bridge between different standards used by the user and the module.

However, any arbitrary relation between analog input signal and analog user input signal can be programmed and executed by the micro-processor.

Setting the parameters of said relation, or selecting among several preprogrammed transformations may be done by sending digital commands to the micro-controller using a front panel or communication interface.

Similarly, the relation between the module produced analog monitoring signal and the analog user output signal may be flexibly set and modified by the software.

BRIEF DESCRIPTION OF THE FIGURES

In order to better understand the present invention and appreciate its practical applications, the following Figures are attached and references herein. Like components are denoted by like reference numerals.

It should be noted that the figures are given as examples and preferred embodiments only and in no way limit the scope of the present invention as defined in the appending Description and claims.

DETAILED DESCRIPTION OF THE INVENTION AND FIGURES

Figure 1:
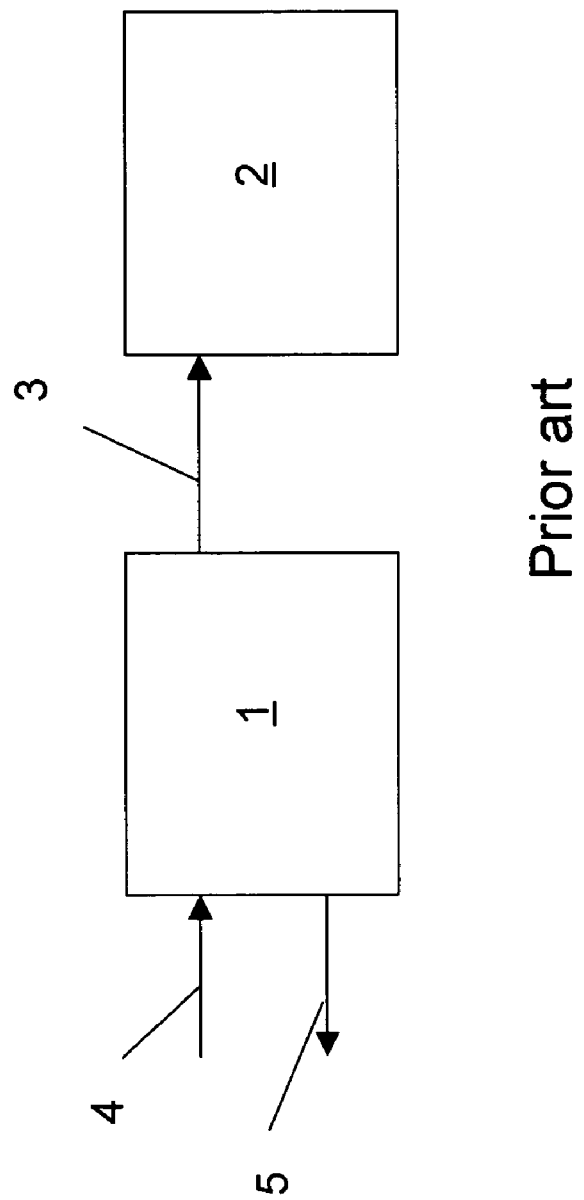
FIG. 1 depicts a block diagram of an adjustable power supply module as used in the art.

Reference is made to FIG. 1 illustrating a block diagram of an adjustable power supply module as used in the art. An adjustable power supply module 1 is connected to a load 2 by a power line 3. An analog input signal applied to an analog input line 4, which is used to adjust a working parameter of the adjustable module 1, for example the voltage supplied to the load 2. Optionally, the module is equipped with an analog monitoring output line 5 for monitoring the operation and status of adjustable power supply module 1.

Figure 2:
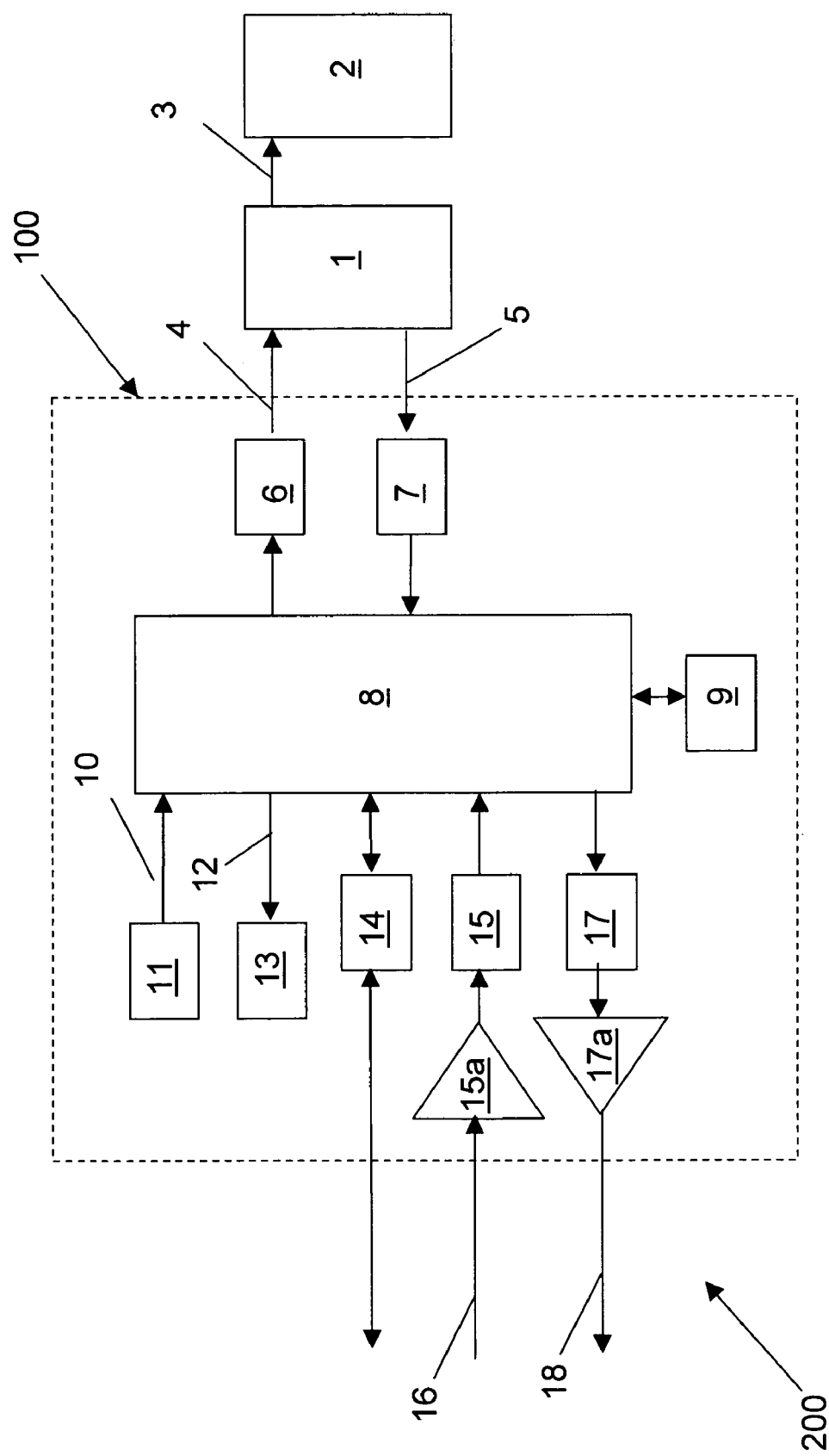
FIG. 2 illustrates a block diagram of a controlled power supply system in accordance with a preferred embodiment of the present invention.

Reference is now made to FIG. 2 illustrating a block diagram of a controlled power system 200 in accordance with a preferred embodiment of the present invention. Controlled power system 200 comprises a digital controlling device 100 to interface between a user and an adjustable power module 1 that is connected to the load 2 by power line 3.

Adjustable power module 1 may be an adjustable power supply. Additionally or alternatively adjustable power module 1 may be an adjustable power absorber unit designed to absorb power generated by load 2. This arrangement is used in testing equipment where the performance of the load is tested under various working condition. A testing system may combine both plurality of power supply modules to power the load and plurality of power-absorbing modules to test the performance of the load. The term "power supply" will be used throughout this document for both power generating and power absorbing device.

Optionally, several power lines are used, for example to supply positive and negative voltages as in bipolar power supply module or several voltages as commonly used in mixed analog-digital systems, or when several type of loads requires different voltage current or filtering properties. In this case, all or few or one of the working parameters of the adjustable module is separately adjusted.

At least one analog input signal applied to at least one analog input line 4 that is used to adjust a working parameter of adjustable power module 1, for example: the voltage supplied to the load, the current supplied to the load, the power absorbed from the load, etc. Optionally, several analog input lines are used to adjust the appropriate working parameters of the adjustable module. Several methods of signaling may be used such as voltage, current, frequency duty-cycle etc.

Optionally, one or more control discrete input lines are used to select mode of operation of the adjustable module, for example, the polarity of the output voltage, current mode vs. voltage mode, etc. Optionally, control discrete input lines may be used to reset the module, for example after fault was detected and corrected.

Optionally, several working parameters define the operation of the same power supply output. For example, one analog input signal could adjust the output voltage of a power supply, the second analog input signal adjust the maximum current of a power supply, a first discrete control signal could define the polarity of said voltage and a second discrete control signal could define the response of the power supply module to current overload where said response could be for example power shutdown or limiting the current to the maximum value.

Optionally, adjustable power module 1 is equipped with one or more analog monitoring output lines 5 for monitoring the operation and status of the module. For example an analog output signal proportional to the load current may be used to monitor the load condition. As another example, analog signal may be used to monitor the total power supplied by the power supply module or its temperature or other variables useful to the user.

Several methods of signaling may be used to encode the analog output signal such as voltage, current, frequency duty-cycle etc.

Additionally or alternatively, the module may be equipped with one or more discrete monitoring output lines that indicate the status of the power supply module. For example indication, if overheating has occurred, which of the power supply lines is overloaded, loss of a supply phase in a three-phase supply module, etc.

Due to existence of large variety of adjustable modules and the large variety of input signal that are required to control them as well as large variety of output signal that are required to monitor them, it is advantageous to construct a digital controlling device 100 to interface between the user and the adjustable power module 1.

In the exemplary embodiment of the present invention, the digital controlling device 100 comprises at least one Analog to Digital Converter (ADC) unit 15, at least one Digital to Analog Converter (DAC) unit 6 and a digital micro-controller 8.

ADC unit 15 receives analog user signal 16. Analog user signal 16 is digitized by ADC unit 15, and the digital values of digital input information are manipulated by micro-controller 8 according to its programming. As a response, micro-controller 8 causes DAC unit 6 to generate an analog signal necessary to adjust the adjustable module according to the user demand. Optionally few ADC units may be used to receive few users analog inputs. Optionally few DAC units may be used to generate few analog signals. Number of ADC units need not be the same as the number of DAC units. For example, one analog user input signal may be manipulated to generate two analog signals of opposite polarities to control dual power supply.

Optionally, micro-controller 8 receives digital user commands through at least one digital input, for example communication input-output (I/O) interface 14 or digital input such as front panel 11. Digital user command may be used to determine the way micro-controller 8 manipulates digital values it receives from ADC 15 to generate analog signal by DAC 6. For example, user may use front panel 11 to select a specific program to be performed by the micro-controller, or set specific values to be used by a program performed by micro-controller 8. Additionally or alternatively, programming said micro-controller 8 may be done by loading a program or specific values through I/O device 14.

In an example of the embodiment, the front panel is used to configure the system so that user analog signal 16 in a range of v1 to v2 volts will be translated to an analog input signal 4 in the range of V1 to V2 where the range v1-v2 is the standard used by the user and the range V1-V2 is a standard used by the adjustable module. Reconfiguring the system to different standard user range v3-v4 can then be done using the front panel 11 or I/O device 14 without hardware modifications. In a simple example of transformation, the analog input signal 4 is set by micro-controller 8 to be a linear function of the user signal 16 according to the equation:

$$\text{analog input signal} = A*(\text{analog user input signal} - B) \quad (1)$$

Where A and B are numerical parameters of the transformation.

Using the front panel or I/O device, the user may set the parameters A and B or select among values already stored in the system.

Any arbitrary relation between analog input signals and analog user signal may be defined and executed by the micro-controller.

Safety limits on the analog output signal 4 may be set or modified in software to protect adjustable power module 1 or load 3 in the event that analog input 15 is erroneously out of safe operation limits. In another exemplary embodiment, micro-controller 8 receives digital user commands through at least one digital input. As a response, cause DAC unit 6 to generate an analog signal necessary to adjust adjustable power module 1 according to the user command. Optionally, several DAC units are used to adjust several parameters of the power supply module.

Since the DAC unit 6 is under the control of a micro-controller, a very flexible operation is possible. For example, discrete input signals could be applied to a discrete input line by programming DAC to produce the desired signal. Additionally, micro-controller 8 may be equipped with digital outputs for providing binary discrete input signals to be connected directly to the power supply module or through binary buffering electronics.

Optionally, an electronic buffer is inserted between DAC 6 and input line 4. Optionally, said electronic buffer may be designed to match the requirements of input line 4 so as to change between bipolar and unipolar values. For example, electronic buffer may be used to boost the voltage of DAC unit 6 or to boost its ability to supply sufficient current to input line 4. Alternatively, said electronic buffer may translate the voltage produced by DAC unit 6 to appropriate current needed to dive a current mode analog input line. Optionally, electronic buffer may be used to translate binary signals from one standard to another. Said electronic buffer is optionally comprised of operational amplifier and optionally configured with appropriate resistors. Optionally, several buffers are used for several lines 4. Optionally, an electronic buffer 15a is used to condition analog user signal 16 before it arrives to ADC unit 15. An exemplary design for such electronic buffer 15a can be seen in FIG. 3. Optionally, electronic buffer 15a may be designed to match the requirements of ADC 15 so as to change between bipolar and unipolar values. For example, electronic buffer 15a may be used to boost or reduce the signal 15 to match the voltage range of DAC 15 or to boost its ability to supply sufficient current to ADC 15. Alternatively, electronic buffer 15a may translate user analog signal from current to voltage or from resistance to voltage form or from bipolar signal to unipolar signal or combination of these translations. Electronic buffer 15a is optionally comprised of operational amplifier and optionally configured with appropriate resistors. Optionally, several buffers are used for several user inputs 16.

Optionally, an analog to digital converter (ADC) 7 is connected to analog output line 5 of the power module 1. In this exemplary embodiment, analog monitoring output signals produced by the power module are sampled and converted to digital values by the ADC unit 7. Micro-processor 8 receives the digital information indicative of the power supply module statues and uses the information according to its programming. Optionally, several ADC units may be used to monitor several output lines 5. Conversion of analog output signals to digital values may be done at regular intervals, or as a response to user command. Binary or discrete value output may be monitored by ADC unit and the digital values are interpreted by the micro-controller. In some embodiments of the invention, monitoring the outputs is done at different intervals. For example, an output line indicating a fault in the power supply module may be monitored frequently, while an output line indicating the temperature may be monitored at less frequent intervals or as a response to a detection of fault. Optionally, binary output lines may be connected directly to the micro-controller or through binary buffering electronics.

Optionally, electronic buffer is inserted between input line 5 and ADC 7. Optionally, said electronic buffer may be designed to match the requirements of the ADC 7 with signals from output line 5. For example, electronic buffer may be used to reduce the voltage on the ADC unit 7 or match its impedance to the output line or to change between bipolar and unipolar values. Alternatively, electronic buffer may translate the current produced by input line 5 to voltage on the ADC 7. Optionally, electronic buffer may be used to translate binary signals from one standard to another. Electronic buffer is optionally comprised of operational amplifier and optionally configured with appropriate resistors. Optionally, several buffers are used for several output lines 5.

Optionally, the user may monitor the status and operation of the power supply module using one or more user digital output channels.

For example, micro-controller 8 may directly supply the user with digital output 12 to drive optional digital display 13. Optionally, few digital displays may be used.

Additionally or alternatively, an output DAC unit 17 could be used to produce analog user output signal 18 for monitoring system operation. Analog user output signal 18 may be used by the user to monitor the operation of the controlled power system 200. Optionally, few DAC units may be used.

Optionally, an electronic buffer 17a is used to condition analog signal produced by DAC 17 before it arrives to the user. An exemplary design for such electronic buffer 17a can be seen in FIG. 3. Optionally, electronic buffer 17a may be designed to match the requirements of user output signal 18 with output produced by DAC 17. Foe example, electronic buffer 17a may be used to change between bipolar and unipolar values. For example, electronic buffer 17a may be used to boost or reduce the signal or to boost its ability to supply sufficient current. Alternatively, electronic buffer 17a may translate analog signal from voltage to current form or from unipolar signal to bipolar signal or combination of these translations. Electronic buffer 17a is optionally comprised of operational amplifier and optionally configured with appropriate resistors. En exemplary design for such electronic buffer 17a can be seen in FIG. 3.

The program needed for the operation of power supply controlling device 100 is optionally stored in memory 9 connected or incorporated into micro-controller 8. The memory may be a factory installed ROM. Optionally, the program could be modified by storing all or parts of the program in a flash memory, EPROM, or RAM.

User commands to power supply controlling device 100 are communicated digitally to micro-controller 8 using one or more digital inputs. For example, one or more digital input devices 11 may be connected to micro-controller 8 via digital input 10. Digital input device 11 may be in the form of a dial, keypad or a keyboard. Optionally few digital input devices may be used.

Additionally or alternatively, a host computer may be used to supply the needed digital inputs and to receive outputs from micro-controller 8. Additionally or alternatively, a communication interface 14 may be connected to micro-controller 8 to communicate both input to and outputs from the micro-controller. Any communication standard may optionally be used such as USB, RS232, GPIB, RS485, LAN or telephone modem, optical communication etc.

Optionally, a proprietary ASIC could be designed that includes several or all the functions of the digital controlling device 100 or controlled power system 200. For example, the micro-controller and the memory could be manufactured as one integrated circuit (IC). Similarly, combinations of other functions could be integrated into one or few ICs. For example, mixed digital and analog IC may combine ADC and electronic buffer into one chip.

Controlled power system 200 can be integrated into a single compact circuit. Alternatively, the digital controlling device 100 could be designed and built as a separate printed circuit to be combined with or sold separately from the power module. It is apparent to a man skilled in the art that parts of controlled power system 200 can be positioned in remote locations without changing their operation or degrade the system performance.

Programming the micro-controller allows great flexibility in the operation of controlled power system 200. The programmability of the micro-controller allows the user to develop various applications to meet his needs without making any hardware modification and at low development cost.

Partial, non-limiting list of applications is given here to illustrate the usefulness of the present invention.

The response constants of a power module can be adapted to the user standards by sampling and digitizing a user analog input signal 16 and generate analog input signal 4 that will cause adjustable power module 1 to produce the desire output. Similarly, a desired user analog output signal 18 can be produced by DAC 17 as a response to sampled analog output 5 after it was sampled by ADC 7 and manipulated by micro-controller 8.

A nonlinear response of adjustable power module 1 can be corrected by calibration of the actual module response from direct measurements or modeling of its output. The correction function is stored in memory 9 and is used by micro-controller 8 to achieve the desired output. Periodic calibration of the power supply (mandatory by regulation in many applications) can easily be done by the software without hardware modification.

Digital feedback loop can be realized and closed by feeding error signals into the micro-controller through analog or digital inputs. For example, stabilization of the output voltage against variations of load current can be achieved by sampling analog output signal proportional to the actual load voltage and programming the micro-controller to adjust the analog input signal that controls the output voltage accordingly. Sophisticated adaptive digital feedback loops algorithms can easily be programmed and improve the system performance. As a consequence, controlled power system 200 is easily adopted to be used in servo systems.

Arbitrary time varying waveforms could be produced by the system by proper programming. For example, sine wave at 50 Hz or 60 Hz could be produced and be used for electronic equipment testing.

The response of the system to detection of fault can be flexibly programmed. While simple short protected power supplies simply shut down in response to current overload, the controlled power system 200 could be programmed to respond by shutting down momentarily and perform several attempts to restart operation. Optionally the response of the system to interruption of normal operation or a detection of fault can be computed by the micro-controller taking into account information about the history of the system operation stored in memory or the status of the system as, or status of external systems or combinations of these data. Alternatively, a digital message with details of the fault event may be communicated through I/O interface 14.

Precisely controlled power ramp up at startup and power ramp down at shutdown could be programmed to prevent damage to the load. Similarly, power-up power-down sequence can be programmed in multi power output systems.

Several user defined or factory preinstalled set ups can be stored and selected by the user. For example, several combinations of voltage output and maximum current could be stored in memory and selected with a single simple command.

Micro-controller 8 may be configured to manipulate the relation between signals on analog monitoring output line 5 and user output signal 18 according to its programming.

Figure 3:
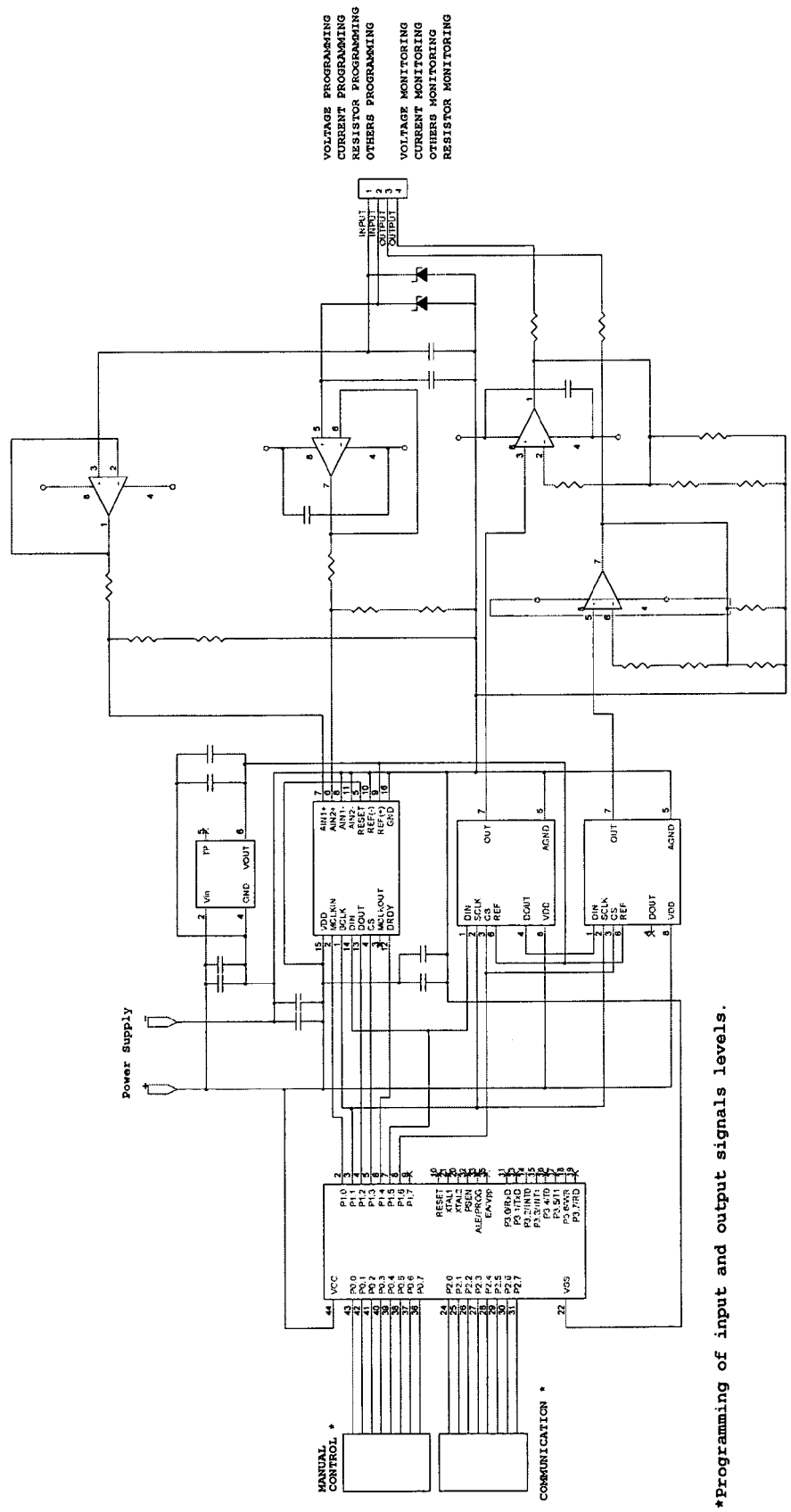
FIG. 3 depicts an electronic illustration of the power supply controlling device in accordance with a preferred embodiment of the present invention.

Reference is now made to FIG. 3 depicting an electronic illustration of digital controlling device 100 in accordance with an embodiment of the present invention.

Optionally, voltage reference 30 is used to increase the accuracy of the DAC or ADC units or both.

In some embodiments of the present invention, the processing power needed to control and monitor adjustable power supply module is relatively low. Thus a suitable micro-controller can be selected from the list of commercially available micro-controllers or microprocessors. Alternatively, a field programmable gate array (FPGA) type of device could be programmed to perform the digital manipulation of data. Alternatively, a proprietary ASIC could be designed.

The use of commercial micro-controller has an advantage of easy programming and available program editing and debugging tools. In the exemplary design using of FIG. 3, a P89C664HFA micro-controller 8 is used. This micro-controller incorporates the necessary memory.

For cost reasons, in this exemplary embodiment, ADC 15 and ADC 7 are dual input units, while DAC units 6 and 17 are single output units. It is clear to a person skilled in the art that using multiple input/output units or using multiplexing devices may reduce cost. Accuracy of DAC and ADC units and the number of bits used for each may not be the same and is chosen to match or exceed the accuracy needed for the application.

While the invention has been described with reference to certain exemplary embodiments, various modifications will be readily apparent to and may be readily accomplished by persons skilled in the art without departing from the spirit and scope of the above teachings.

It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art.

It is noted that some of the above described embodiments may describe the best mode contemplated by the inventors and therefore include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims. The terms "comprise", "include" and their conjugates as used herein mean "include but are not necessarily limited to".

The invention claimed is:

1. A digital controller device for interfacing a user of adjustable power unit and an adjustable power module comprising:
    at least one analog to digital converter for converting analog input signal provided by the user to digital input;
    a micro-controller adapted to receive said input digital information and operate at least one digital to analog unit in response to said digital input information;
    at least one digital to analog converter unit adapted to produce analog input signal for controlling the adjustable module;
    wherein the relation between analog input signal and analog user input signal is controlled by micro-controller to essentially follow the linear equation: analog input signal equals A multiplies by the subtraction of B from analog user input signal.

2. The device according to claim 1, wherein said micro-controller further comprising at least one digital input for receiving at least one user digital command wherein said user digital command changes the values of at least one of the parameters A, B, or both.

3. The device according to claim 2, wherein calibrating the response of adjustable module to analog user input signal is performed by changing the values of at least one of the parameters A or B.

4. The device according to claim 3, wherein the relation between user output signal and analog monitoring output signal is controlled by micro-controller to essentially follow the linear equation: user output signal equals C times subtraction of D from analog monitoring output signal.

5. The device according to claim 4, wherein said micro-controller further comprising at least one digital input for receiving at least one user digital command wherein said user digital command changes the values of at least one of the parameters C, D, or both.

6. A method for controlling adjustable module comprising:
    receiving analog input signal from a user;
    converting said analog input signal to digital input information;
    processing digital input information using a micro-controller;
    producing at least one analog input signal for controlling adjustable module by a digital to analog unit in response to the processed digital input information; wherein processing digital input information is a linear transformation between said user input signal and said analog input signal according to the equation: analog input signal equals A multiplies by the subtraction of B from analog user input signal.

7. The method as claimed in claim 6, wherein said A and B are determined by calibration process.

* * * * *